United States Patent [19]

Rovinsky et al.

[11] Patent Number: 4,462,731
[45] Date of Patent: Jul. 31, 1984

[54] SPLIT NUT ASSEMBLY

[76] Inventors: William Z. Rovinsky, 212 Haypath Rd., Old Bethpage, N.Y. 11804; Isaac Frucht, 196-47 73rd Ave., Flushing, N.Y. 11366

[21] Appl. No.: 376,277

[22] Filed: May 10, 1982

[51] Int. Cl.³ .............................................. F16B 37/08
[52] U.S. Cl. ..................................... 411/433; 269/173
[58] Field of Search ............... 411/266, 267, 268, 269, 411/270, 432, 433, 434, 437; 269/173, 174, 176, 178

[56] References Cited

U.S. PATENT DOCUMENTS

| | | | |
|---|---|---|---|
| 370,168 | 9/1887 | Truxal | 411/433 X |
| 625,448 | 5/1889 | Jaemchen | 411/432 X |
| 815,982 | 3/1906 | Schubert et al. | 411/433 |
| 1,024,307 | 4/1912 | Boles | 411/270 |
| 3,675,530 | 7/1972 | Victor | 411/433 |
| 4,274,323 | 6/1981 | Resnicow | 411/433 |

FOREIGN PATENT DOCUMENTS

| | | | |
|---|---|---|---|
| 1061613 | 9/1979 | Canada | 411/433 |
| 642951 | 3/1937 | Fed. Rep. of Germany | 411/437 |
| 907211 | 6/1945 | France | 411/433 |
| 124396 | 2/1928 | Switzerland | 411/270 |
| 433699 | 8/1935 | United Kingdom | 411/268 |

Primary Examiner—Thomas J. Holko
Attorney, Agent, or Firm—Leonard Belkin

[57] ABSTRACT

A split nut assembly for mounting on a threaded stud or shaft without passing over the end of the stud or shaft. The assembly consists of a nut divided into two equal parts and a shell equally divided. The shell when assembled fits over the nut so that the assembly can be rotated and tightened together. In a separate embodiment, lock nut capability is provided by providing tapered surfaces on the shell and the nut to force the latter radially against the stud or shaft while the assembly is tightened in place. In another embodiment, a press fit arrangement is provided.

4 Claims, 11 Drawing Figures

SPLIT NUT ASSEMBLY

BACKGROUND OF THE INVENTION

This invention relates to a split nut assembly which is designed to be mounted on a threaded stud or shaft without passing over the end of the stud or shaft.

Nuts and threaded studs or shafts are extensively employed in virtually every technology involving mechanical configurations. The simple nut and threaded stud or shaft for attaching two or more parts, with the free end of the stud or shaft exposed is a common arrangement in which the nut can readily be mounted and removed.

In more complex arrangements, however, as found in piping supports in construction and in machinery, the stud or shaft may perform a variety of functions, such as connecting together two or more assemblies at different locations, or the nut and stud or shaft may not only connect together plates or walls, but the stud or shaft may not be threaded over its whole length.

It is readily seen that in a complex arrangement the necessity to remove a conventional nut would ordinarily involve the removal of all elements on the stud or bolt starting from the free end to get to the particular nut which requires removal.

This problem is not new, and a variety of efforts have been made to overcome this difficulty, including the use of a split nut which can be mounted and removed without passing over the free end of the stud or bolt.

An example of a split nut designed for such application is shown in U.S. Pat. No. 4,274,323 which illustrates a variety of split nut configurations. In FIG. 21 of that patent there is shown a split nut having two pairs of split washers 204 which engage with the former to hold it together as it is tightened. This assembly has six parts, while another arrangement shown in FIG. 2 consists of four parts.

An important drawback of the split nut assemblies shown in the aforementioned U.S. patent is the distortion in the washer which can occur when the nut is tightened. As the nut is being tightened in place, the washer parts are rotated through projections which engage grooves in the nut parts. As the washers presumably are tightened against a surface or wall being clamped, it is seen that the washer can be distorted, and if the nut is tightened enough, presumably the projections could be torn loose or sheared. In addition, as the washers are annular so that both the washers and nuts presumably may contact the wall, there is some question as to the effectiveness of the arrangement.

SUMMARY OF THE PRESENT INVENTION

The drawbacks and problems associated with previous nut assemblies are largely overcome in the present invention by providing for shells in such assemblies which isolate completely the split nut from the surface against which it is tightened and avoid the use of projections which could distort the washers.

In a preferred embodiment of this invention there is provided a split nut assembly for use on a threaded stud or shaft consisting of two parts which form a nut when assembled, and a cup-shaped shell made of parts which when assembled enclose the outer surface of the nut to form a gripping surface, the bottom part of the shell separating the nut from the wall against which it is tightened. The nut is thus tightened against a surface through a retainer which is provided with a rim to hold the nut assembly together and to provide a gripping surface. When the assembly is tightened it cannot come apart; to remove the nut, the assembly is loosened, and after a few revolutions the parts of the nut and the shell come apart readily, thereby facilitating its removal and replacement without having to go to the free end of the stud or shaft which may not be readily accessible. In another preferred embodiment of this invention, the assembly is modified so that as the latter is tightened in place, a locking action occurs with the result that the assembly cannot be loosened by vibration or other rough in-service use. The shell in this embodiment acts like a lockwasher pushing two halves of nut onto the shaft in radial direction, which adds to the utility and effectiveness of the device. Other embodiments, incorporating the principles of this invention, having other features are possible.

It is thus a principal object of this invention to provide an improved split nut assembly for mounting on a stud or shaft without passing over the end thereof.

A further object of this invention is to provide a split nut assembly with either lock nut or press fit capability.

Other objects and advantages of this invention will hereinafter become obvious from the following description of preferred embodiments of this invention.

DESCRIPTION OF THE PREFERRED EMBODIMENTS

Figure 1:
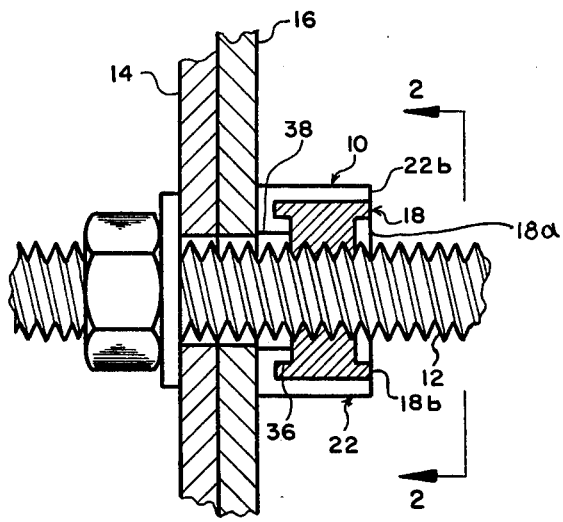
FIG. 1 is a section view taken along 1—1 of FIG. 2 of a preferred embodiment of this invention.
Figure 2:
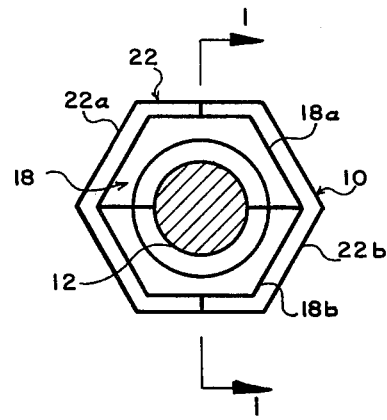
FIG. 2 is a view along 2—2 of FIG. 1.

Referring to FIGS. 1 and 2 there is illustrated a split nut assembly 10 embodying the principles of this invention mounted on a threaded stud or shaft 12 and tightened to hold elements 14 and 16 together. It is understood that assembly 10 may be employed generally where nuts are employed and instead of elements 14 and 16 there may be other nuts or members, singly or plural, which may be held in place together by stud or shaft 12.

Split nut assembly 10 consists of a split nut 18 made up of parts 18a and 18b and a split retaining shell 22 made up of a pair of parts 22a and 22b with their parting lines offset by 90 degrees as illustrated so that shell 22 when assembled holds split nut parts 18a and 18b together. When threaded tightly against element 16, nut 18 contacts the former through shell 22 and split nut assembly 10 is thereby held together.

For details of nut 18 and retaining shell 22, reference is made to FIGS. 3-6.

Figure 3:
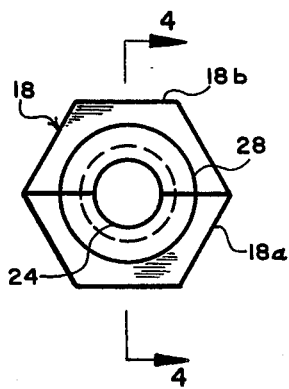
FIG. 3 is an elevation view of the assembled nut parts of FIGS. 1 and 2.
Figure 4:
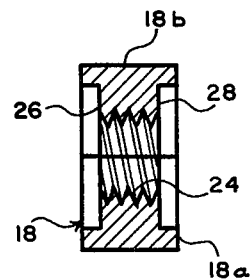
FIG. 4 is a section view along 4—4 of FIG. 3.

Split nut 18 is a conventional hex type nut with a threaded opening 24 except that it is split into two halves 18a and 18b, and there is provided two internal recesses 26 and 28. As illustrated in FIG. 3, the split is along the parting line indicated and the two separate parts 18a and 18b must be held together so as to form the hex nut which is there illustrated. It should be noted that while two recesses 26 and 28 are illustrated, only one is actually in use. However, preferably two recesses would be employed so that hex nut 18 may be assembled without regard to its orientation on stud or shaft 12.

Figure 5:
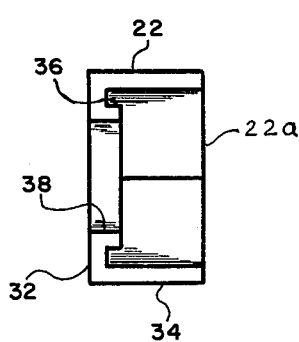
FIG. 5 is a section view along 5—5 of FIG. 6 of the retaining shell shown in FIGS. 1 and 2.
Figure 6:
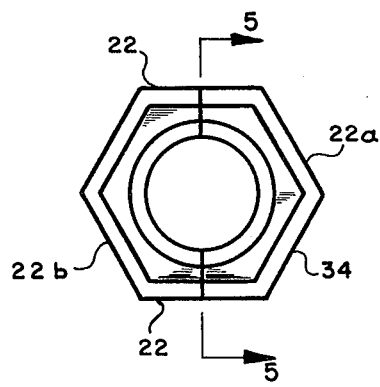
FIG. 6 is a view of the shell parts in their assembled form.
Figure 4A:
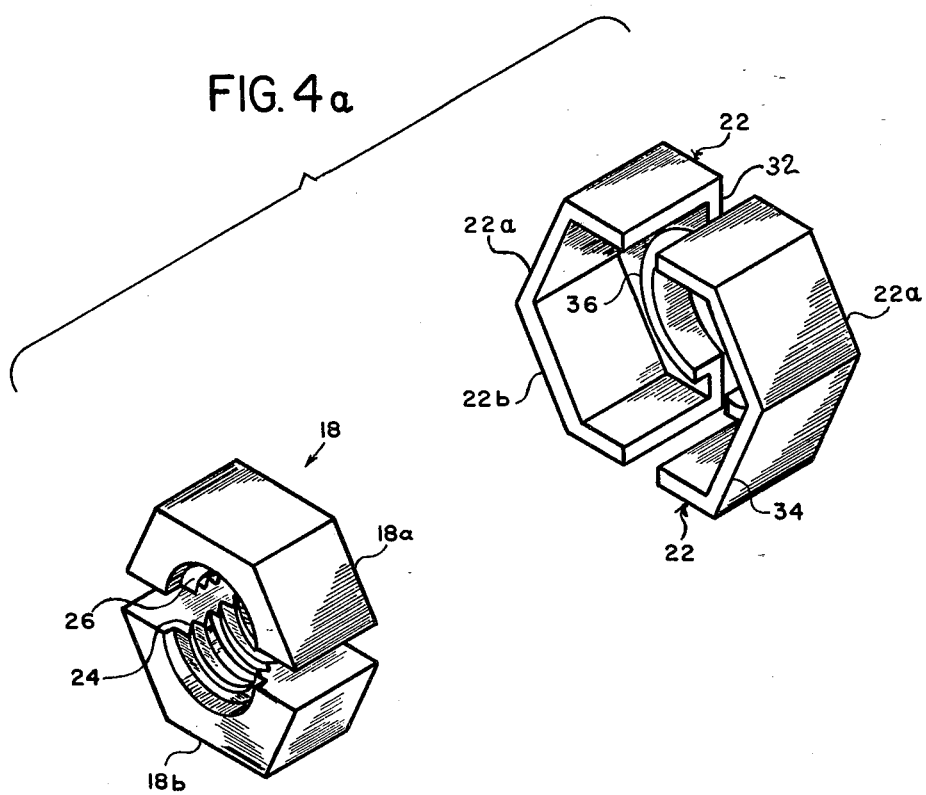
FIG. 4a is an exploded isometric view of the split nut assembly shown in the preceding figures.

Shell 22, when its parts 22a and 22b are assembled as shown in FIGS. 5 and 6, consists of a wall section 32 with an annular rim 34 extending in one direction as shown to form an enclosure into which hex nut 18 would fit as shown in FIG. 1. A hub 36 is provided to fit into recess 26 or 28 to facilitate ease of assembly and use. Opening 38 to accommodate stud or shaft 12 is not threaded and is large enough to provide clearance for stud or shaft 12. It is understood that while nut 18 is shown to have a hex configuration, other shapes may be employed.

In the use of split nut assembly 10, the two halves 18a and 18b of nut 18 are put together over stud or shaft 12 adjacent the place where it will be tightened, and while being held together, parts 22a and 22b of shell 22 are put together around nut 18 with hub 36 fitting into recess 26 or 28 and rim 34 over split nut 18, as illustrated in FIG. 1. Wall section 32 must be on the side of nut 18 facing the wall or element against which the latter will be tightened, and the parting lines of the two assemblies must be offset by 90 degrees, as illustrated in FIG. 2. Rim 34 should closely conform to the hex or other configuration of nut 18 so as not to cause distortion of shell 22 when nut 18 is tightened against element 16. Light tightening will keep the assembly together and a wrench or other tool may be employed to obtain the degree of tightening desired. The thickness of rim 34 is such that its outer shape will accommodate a standard size wrench as, for example, one size larger than the wrench which will fix hex nut 18.

To disassemble split nut assembly 10, the latter is loosened and the various segments will separate.

In another preferred embodiment of this invention, the split nut assembly of this invention can be made to function as a lock nut which will withstand severe operating conditions without becoming loose. This is accomplished in the present invention by utilizing the shell to clamp the split nut on the stud or shaft.

Figure 7:
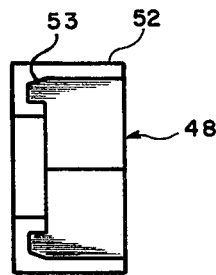
FIG. 7 is a section view of an alternative embodiment of shell parts in assembled form of this invention.
Figure 8:
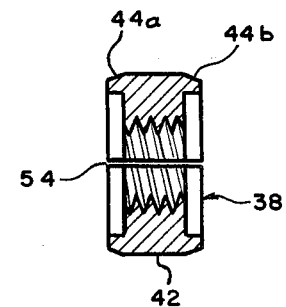
FIG. 8 is a section view of assembled nut parts to be employed with the shell in FIG. 7.

For the details of how this is accomplished, reference is made to FIGS. 7 and 8. In FIG. 8 is illustrated a split hex nut 38. Nut 38 is identical to split nut 18 except that its outer surface 42 is provided with chamfers or tapers 44a and 44b adjacent the edges, the tapers having flat surfaces making an angle up to 45 degrees with surface 42. In FIG. 7 is illustrated a shell 48 identical to shell 22 except that on the underside of rim 52 there is an annular fillet or taper 53 having a flat exposed surface designed to mate with taper 44a or 44b on split nut 38. The length of each taper 44a and 44b should be less than the length of taper 53. In addition, along the parting line of split nut 38 it will be seen that a portion of the mating surfaces is removed leaving a small space 54 when nut 38 is mounted on its stud or shaft (not shown). In other words, the two parts of nut 38 do not touch along the parting line when assembled on a stud or shaft.

In this way, it is evident that when shell 48 is assembled with split nut 38 on stud or shaft 12 as in FIG. 1, as the assembly is tightened, taper 53 will be presented on taper 44a or 44b causing the threaded portions of the parts of nut 38 to be pressed tightly against the threads on its stud or shaft thereby preventing rotation and loosening of the assembly when in service.

In still another embodiment of this invention, split nut assembly 10 may be put in place with a so-called press fit, where the shell and nut are wedged together, so that it will not readily come apart when loosened. In certain applications of the device this feature could be very useful.

Figure 9:
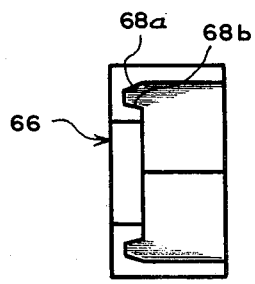
FIG. 9 is a section view of another alternative embodiment of shell parts in assembled form.
Figure 10:
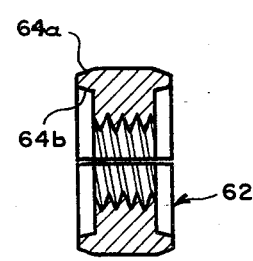
FIG. 10 is a section view of assembled nut parts to be employed with the shell in FIG. 9.

This is accomplished in accordance with this invention, as illustrated in FIGS. 9 and 10, by providing split nut 62 with slightly tapered surfaces 64a and 64b up to about 10 degrees from the axial direction. Shell 66 would be provided with matching tapers 68a and 68b. When shell 66 and nut 42 are assembled and tightened on a stud or shaft the protruding portion of nut 62 bounded by tapers 64a and 64b becomes wedged in between tapers 68a and 68b of shell 66. The length of tapers 64a and 64b should be less than the length of tapers 68a 68b for the wedging to be effective.

When nut 62 is assembled on a stud or shaft (not shown) before tightening, the two parts may or may not be designed to come together in this embodiment.

It is thus seen there has been provided an improved split nut assembly capable of more effective and efficient utilization than is possible with split nuts heretofore in use or available.

While certain embodiments of this invention have been described, it is understood that many variations thereof are possible without departing from the principles of this invention.

What is claimed is:

1. A split nut assembly for mounting on and engagement with a threaded shaft or stud without passing over the end of said shaft held together by tightening of said assembly and separating completely upon loosening of said assembly comprising:
   (a) nut means consisting of two parts forming a nut when assembled having a threaded opening for engagement with said shaft, having an outer surface shaped to permit gripping thereof, and further having an internal annular recess on at least one side surrounding said threaded opening; and
   (b) retaining shell means consisting of two parts forming when assembled a wall section with an opening therethrough sufficiently large to accomodate said shaft, and having an annular rim extending from one side of said section, the inner surface of said rim shaped to fit over and engage the outer surface of said nut means, and the outer surface of said rim being shaped to permit gripping thereof by a tool so that rotation of said shell will cause rotation of said nut, the parting lines between nut parts and those between shell parts being offset by 90°, and said shell being provided with an annular hub inside of and spaced from said rim surrounding its opening, said hub fitting into said recess of said nut means for facilitating ease of assembly and use of said split nut assembly.

2. The split nut assembly of claim 1 having means to clamp the nut parts against said threaded shaft as said split nut assembly is tightened in place comprising an annular tapered fillet on the underside of said rim and an annular taper on the outer surface of said nut facing said tapered fillet, the length of said taper being less than the length of said fillet.

3. The split nut assembly of claim 1 having means to press fit together the nut and shell parts whereby said assembly will remain intact when said assembly is loosened on said shaft.

4. The split nut assembly of claim 3 in which said press fit means includes slightly tapered surfaces on the inner surface of said rim and the outer surface of said rim and said nut is provided with matching tapered surfaces.

* * * * *